Dec. 19, 1961 G. A. DOTTO ET AL 3,013,636
BRAKES
Filed April 20, 1959 2 Sheets-Sheet 1
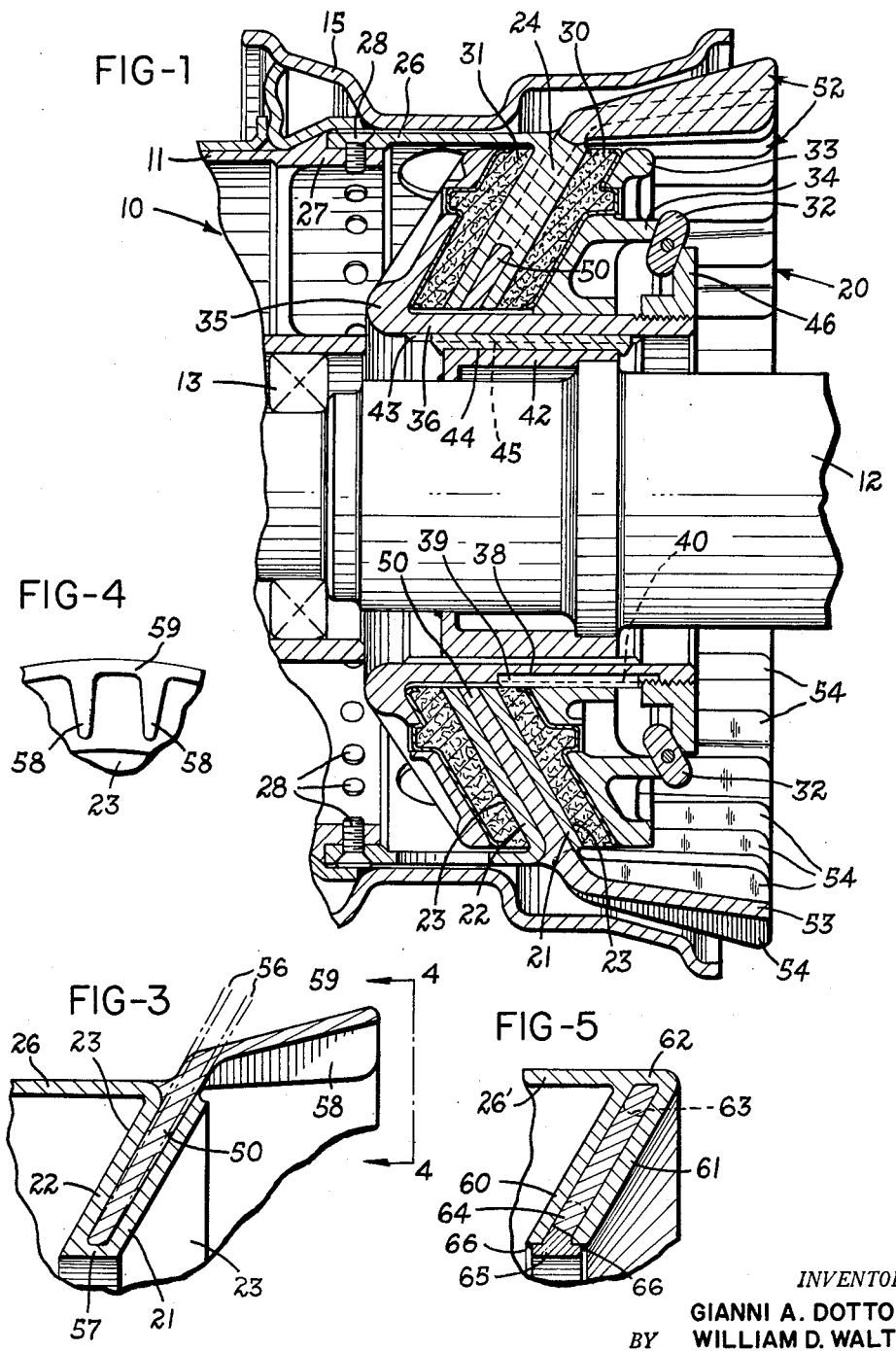
INVENTORS
GIANNI A. DOTTO &
BY WILLIAM D. WALTHER
Marechal, Biebel, French & Bugg
ATTORNEYS Dec. 19, 1961 G. A. DOTTO ET AL 3,013,636
BRAKES
Filed April 20, 1959 2 Sheets-Sheet 2
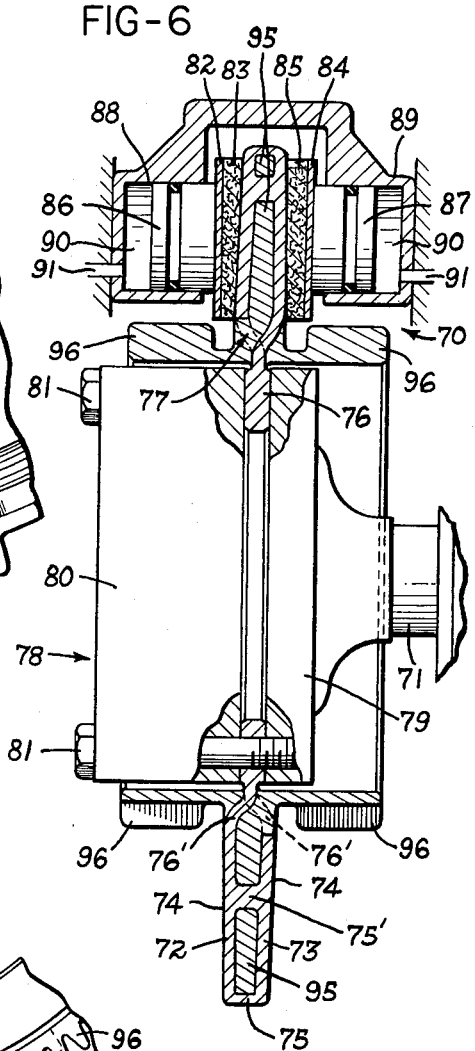
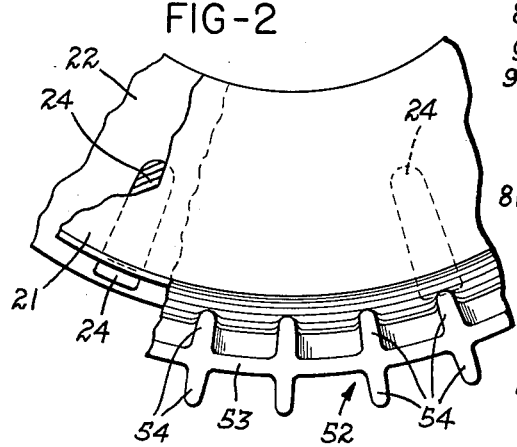
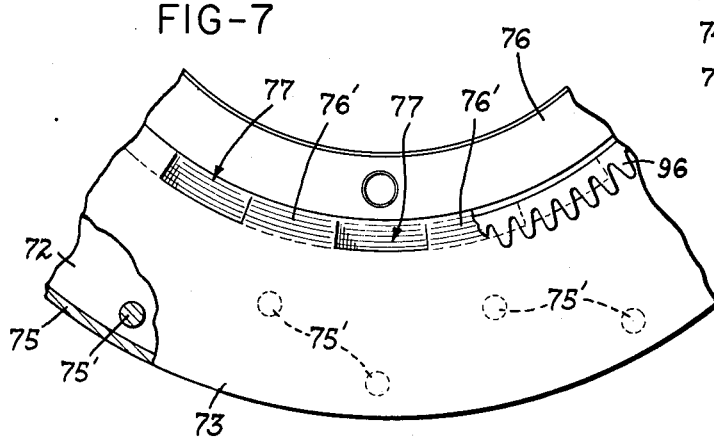
INVENTORS
GIANNI A. DOTTO &
BY WILLIAM D. WALTHER
Marechal, Biebel, French & Bugg
ATTORNEYS

United States Patent Office 3,013,636
Patented Dec. 19, 1961

3,013,636
BRAKES
Gianni A. Dotto and William D. Walther, Dayton, Ohio, assignors to The Dayton Steel Foundry Company, Dayton, Ohio, a corporation of Ohio
Filed Apr. 20, 1959, Ser. No. 807,376
8 Claims. (Cl. 188—72)

This invention pertains to brakes and more particularly to an improved disk element of a disk brake.

The internal structural confinement of disk brake components which must absorb and dissipate a large quantity of heat makes the cooling of the brake components necessary if overheating and brake fading are to be avoided. Brake cooling arrangements most commonly provide for the cooling of the disk element. Attempts at centrifugally inducing a cooling fluid, such as air, have been found insufficient, particularly where the disk is enclosed against dirt, or used on vehicles of low angular velocity. The brake of this invention overcomes these difficulties by providing a heat sink including a filling material for the absorption and conduction of friction generated heat from the braking surfaces for ultimate dissipation.

It is therefore a principal object of this invention to provide a brake which may be advantageously employed in heavy duty vehicles for the control of a wide range of angular velocities and masses.

A further object of this invention is to provide a brake element for the absorption and conduction of heat from a braking surface for ultimate dissipation.

A further object of this invention is to provide a brake with a disk member having a pair of oppositely disposed friction plates forming a space therebetween within which is filled a material having a relatively high coefficient of heat conductivity as compared to the plates for the absorption and conduction of heat from the plates together with the provision of means, such as cooling fins integrally extended from the filling material, for the dissipation of the conducted heat into a fluid stream.

An additional object of the invention is the provision of a brake having a heat sink including a filling material of relatively low melting point and being arranged to prevent possible loss of the material in molten state.

A still further object of this invention is to provide a disk element for a disk brake including a pair of spaced apart oppositely disposed friction plates forming a space therebetween of tapered cross section with the width of the taper being increased in the direction of heat flow from the plates to a heat exchange medium and within which a heat sink material is filled.

A further object of this invention is to provide a brake with an enclosed heat sink in one of the brake members, the material forming a part of the sink having a usefully high heat of fusion for the absorption of heat from the brake member.

Other objects and advantages of the invention will be apparent from the following description, the accompanying drawings, and the appended claims.

In the drawings:

FIG. 1 is a partial sectional view through a disk brake assembly for a road wheel of a motor vehicle showing one embodiment of the invention as applied to a conical disk;

FIG. 2 is an elevational view of a radial segment of the disk of FIG. 1 with a portion of the filling and one of the plates broken away to expose the details of the web portions;

FIG. 3 is a partial sectional view of a modified form of the disk of FIG. 1;

FIG. 4 is an end view of a modified cooling fin arrangement looking generally as indicated by the line 4—4 of FIG. 3;

FIG. 5 is a partial sectional view of another modified form of the disk of FIG. 1 showing the enclosed heat sink;

FIG. 6 is a sectional view of a further embodiment of this invention as applied to a radial disk brake; and FIG. 7 is an elevational view of a radial segment of the disk element of FIG. 6 with a portion of the filling and one of the plates broken away to expose the details of the web portions.

Referring to the drawings, which illustrates preferred embodiments of this invention, a disk brake assembly is indicated generally at 10 and includes a wheel 11 rotatably mounted on a relatively fixed axle 12 by bearings 13. A rim 15 upon which a tire may be mounted, forms a part of the wheel 11 which may be a road wheel of a motor vehicle. The assembly 10 includes a disk, constructed according to the teachings of this invention, and shown generally at 20. The disk 20 includes a pair of spaced apart, oppositely disposed annular friction plates 21 and 22 of generally frustoconical form. The friction plates 21 and 22 each have an outer braking surface 23, are formed of material, such as cast iron, having a high resistance to wear and are therefore characterized by relatively poor heat conductivity.

The disk 20 includes means for integrally joining the friction plates 21 and 22 in fixed spaced relation to each other including a plurality of discontinuous web portions 24 forming an integral part of the plates 21 and 22 and extended therebetween. The web portions 24 are placed radially about the disk 20 in spaced relation to each other. The plate 21 in FIG. 2 has been partially broken away to expose the plate 22 and a fragment of one of the web portions 24 as being extended between the plates 21 and 22.

Means for mounting the disk 20 for rotation with the wheel 11 include an annular flange 26 formed as an integral axial extension of the plates 21 and 22 at the outer radius of the plates. The wheel 11, in turn, includes an axially extended, disk-supporting shelf 27 which is arranged for engagement with the annular flange 26. The flange 26 is secured to the shelf 27 by a plurality of mounting bolts 28.

The brake assembly 10 includes actuating means for effecting the frictional engagement of relatively moving cooperating brake members with the braking surfaces 23 of the disk 20. Such means may take the form of friction pads carried by pressure and reaction braking members disposed on either side of the disk, together with apparatus for applying axial force to the braking members for effecting frictional engagement with the disk 20. A disk brake actuating mechanism is shown somewhat diagrammatically in FIG. 1 as including annular pads 30 and 31 of friction material disposed for axial frictional engagement with the braking surfaces 23 of the plates 21 and 22 in response to the rotation of cam 32. The pad 30 is supported for axial engagement with the plate 21 on an annular pressure member 33 having a cam follower portion 34 in coacting engagement with the cam 32. Similarly, the pad 31 is carried by an annular reaction member 35 for engagement with the plate 22.

The members 33 and 35 are arranged in interfitting and axial sliding arrangement one with the other by the provision of an axially extended, annular foot 36 on the reaction member 35 upon which the pressure member 33 is carried for relative movement. Relative axial movement is provided between the members 33 and 35, and relative rotational movement is restrained, by a keyway 38 formed in the foot 36 within which a key 39 is fitted for engagement with a key slot 40 formed in the inner surface of the pressure member 33.

Means are included for mounting the members 33 and 35 on the axle 12 for relative movement with the disk 20 including an annular adapting collar 42 welded to the axle upon which the reaction member 35 is mounted for limited axial movement. The foot 36 of the member 35 is internally slotted at 43 for engagement with a key 44 in a keyway 45 on the collar 42. A cam follower 46 is mounting on the foot 36 in coacting relation to the cam 32. The rotation of the cam 32 against the pressure member 33 and the follower 46 causes the braking application of the pads 30 and 31 to the braking surfaces 23 of the plates 21 and 22.

The disk 20 is provided with means for absorbing and dissipating the friction-generated heat caused by this braking application. Such means includes a filling 50 which is preferably substantially solidly formed, as by casting in the molten state, in the space between the plates 21, 22 and the web portions 24. The filling 50 in this embodiment preferably consists of a metal characterized by a relatively high coefficient of heat conductivity as compared to the plates for the absorption of heat from the plates in the manner of a heat sink, and for conduction of the heat and ultimate dissipation in a heat exchange medium at a point remote from the plates. Heat exchange means, in the form of cooling fins 52, are integrally formed with the filling 50 and extended from the plates 21 and 22 for coaction with a heat exchange medium such as a fluid stream or air, for the dissipation of the conducted heat into the medium. The cooling fins 52 include an annular continuous web 53 formed as an integral extension of the filling 50 upon which is formed a plurality of vanes 54, FIG. 2.

As is perhaps more clearly shown in FIG. 3, the plates 21 and 22 form a space therebetween of tapered cross section, as shown at 56, and the cooling fins 52 are extended from the plates 21 and 22 at the region of greatest cross section. The effect of the taper 56 is to provide additional filling 50 for establishing a good thermal path from the plates to the point of ultimate dissipation into a fluid stream.

An occasion may arise where the filling 50 may become molten due to an unusually severe application of the friction material to the disk 20. Although such a heating condition is expected to be transient and of short duration, it may nevertheless result in the loss of the filling unless provision is made for its retention. An arrangement for this purpose is illustrated in FIG. 3 wherein the plates 21 and 22 are circumferentially integrally joined together at a wall portion 57. The filling 50 is solidly formed between the plates 21 and 22 against the wall portion 57, and the cooling fins 52 are integrally formed with the filling and extend therefrom at a point on the filling remote from the wall portion 57. It will be seen that should a condition occur wherein the absorbed heat has sufficient energy to melt the filling 50, this melting would occur at a region remote from the cooling fins 52, and the enclosing wall portion 57 will prevent the accidental escape of the molten filling 50.

FIGS. 3 and 4 also illustrate a modified form of the fins 52 wherein a plurality of vanes 58 are integrally extended radially inwardly from a continuous annular rib 59. The vanes 58 are preferably formed to provide a greater cooling area than the individual vanes 54 of FIG. 1 in order to provide an equivalent cooling surface.

FIG. 5 illustrates an alternate disk construction for the disk brake of FIG. 1 which incorporates a heat sink for the absorption of heat from the friction plates. The mounting flange 26' of the disk includes a pair of annular spaced apart friction plates 60 and 61 which are integrally joined by a continuous wall 62 at the outer radius of the disk. The plates 60, 61 include a plurality of integral discontinuous webs 63 extended therebetween, one of which is shown in broken outline form in FIG. 5.

A heat sink material 64 having a melting point below that of the plates 60 and 61 and characterized by a relatively high latent heat of fusion is formed in the space between the plates. The material 64 may be aluminum, copper or one of a number of salts, such as sodium fluoride, having high latent heats of fusion. Upon the occurrence of severe braking, the melting of the material 64 will effect the absorption of the heat which caused the melting thereby defining the maximum temperature of the disk substantially at the melting point of the material. Means for the closure of the space between the plates 60 and 61 to provide for the retention of the molten material 64 includes an annular shouldered ring 65. The ring 65 is welded at 66 across the open end of the plates after the material has been poured into the space between the plates 60 and 61.

An embodiment of the invention applied to a radial disk brake is shown in FIG. 6 as including a disk 70 mounted for rotation on an axle 71. The disk 70 includes a pair of spaced apart annular friction plates 72 and 73 each having an outer braking surface 74. The plates 72 and 73 are integrally joined in fixed spaced apart relation by an outer circumferential wall portion 75 and a plurality of integral web portions 75'. The portions 75' are disposed between the plates 72 and 73 in staggered relation as is shown in FIG. 7 where the plate 72 is partially broken away to expose a fragment of the plate 73 and one of the portions 74 in section.

Means are included for mounting the disk 70 for rotation with the axle 71 including a radially inwardly extended annular flange 76. The flange 76 is integrally connected to the plates 72 and 73 by narrow radially extended disk root portions 76' which are alternately extended from the flange 76 first to the plate 72 and then to the plate 73 thereby providing for alternating open spaces 77 between the braking surfaces 74 and the mounting flange 76. The axle 71 is provided with a split hub 78 having a right-hand portion 79 integral with the axle 71 and a detachable left-hand portion 80. The flange 76 of the disk 70 is secured for rotation on the hub 78 between the split portions 79 and 80 and secured by bolts 81 for rotation with the axle 70.

A disk brake actuating mechanism for the brake of FIG. 6 is shown somewhat diagrammatically as including a pressure member 82 having a pad 83 of friction material arranged for braking application to the surface 74 of the plate 72. The mechanism also includes a reaction member 84 having a pad 85 of friction material arranged for braking application to the plate 73. A pair of hydraulic pistons 86 and 87 are arranged for movement axial to the disk 70 in fixed cylinders 88 and 89. Fluid chambers 90 of the cylinders 88 and 89 are actuated by hydraulic pressure through hydraulic leads 91 to exert braking force on the members 82 and 84 in the manner well known in the art.

As in the case of the disk 20, the plates 72 and 73 of the disk 70 form a space of tapered cross section within which is formed a filling 95 without air passageways. The filling 95 may consist of the materials, and be formed in the manner, already described in connection with the filling 50 of FIG. 1. The filling 95 extends through the alternating open spaces 77 in the disk 70 to form a plurality of integral cooling fins 96 remote from the wall portion 75. The cooling fins 96 are axially extended from the disk 70 adjacent the region of greatest cross section for coaction with a fluid stream for the dissipation of the conducted heat from the plates 72 and 73 into the stream. In the embodiment of FIG. 6, the taper of the plates 72 and 73 has the effect of partially offsetting the loss in volume of the filling 95 between the plates due to the decreasing radius.

The operation of the invention is, for the most part, self-explanatory from the description of the invention and is briefly described first with reference to FIG. 1, it being understood that this description applies equally to the embodiment shown in FIG. 6. The application of braking force to the members 33 and 35 of the brake of FIG. 1 causes the frictional engagement of the pads 30 with the braking surfaces 23. The heat thus generated at the plates 21 and 22 is absorbed by the frictional surfaces and the filling 50 in the manner of a heat sink and transported by conduction through the filling 50 to the vanes for dissipation within a fluid stream. The taper 56 provides increased cross section of the filling 50 with increasing accumulation of heat flow to provide a good thermal path from the plates 21 and 22 to the integral fins 52. The remote placement of the fins and their extended relation to the plates provide the means by which the heat energy may be dissipated at a point remote from the plates themselves.

The embodiment of FIG. 5 differs from that shown in FIGS. 1 and 6 in that no cooling fins are used. However, this embodiment of the brake utilizes to a greater extent the concept of a heat sink for the absorption of heat from the friction plates. In ordinary service, the sink capacity provided by the filling material 64 will alone provide for sufficient cooling of the plates 60 and 61. However, under more severe conditions, melting of the material 64 serves to hold the temperature of the plates substantially at this melting point. It is therefore seen, due to the availability of relatively high latent heats of fusion for the material 64, that a large quantity of heat can be absorbed by means of a small quantity of filling material. The brake of FIG. 5 has particular application where the embodiment of externally extended fins is not desired or practicable by permitting greater latitude in the design and arrangement of internal brake components.

The absorbed heat is released as the material returns to the solid state, and this reverse process normally occurs between braking applications when the heat may most advantageously be carried from the disk by the combined processes of radiation, conduction and convection.

It is seen that this invention provides a disk brake having unique cooling properties for the disk, permitting considerable latitude in the engineering design of brakes. The brakes of this invention are particularly suitable for use wherever high brake loading occurs such as in heavy trucks, busses and military vehicles.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A disk brake comprising a disk having a pair of spaced apart friction plates with outer braking surfaces, said disk including a mounting flange formed of the material of said plates and attached for the support of said plates, cooperating brake members disposed adjacent said friction plates for frictional engagement with said braking surfaces, means for mounting said brake members and said disk for relative rotational movement to each other, a filling formed between said plates having a high coefficient of heat conduction as compared to said plates for the conduction from said plates of heat generated by the frictional engagement of said members with said surfaces, and heat exchange means integrally formed with the said filling and extended from said plates for coaction with a heat exchange medium for the dissipation of the conducted heat into said medium.

2. A disk brake comprising a disk having a pair of spaced apart oppositely disposed annular friction plates with outer braking surfaces including an integral annular support flange, cooperating brake members disposed on either side of said friction plates for frictional engagement with said braking surfaces, means for mounting said brake members and said disk for relative rotational movement to each other, a filling substantially solidly formed between said plates having a high coefficient of heat conduction as compared to said plates for the conduction from said plates of heat generated by the frictional engagement of said members with said surfaces, a wall closure portion forming an integral part of said plates and circumferentially joining said plates together for the retention of said filling, and heat exchange means integrally formed with the said filling and extended from said plates at a point remote from said wall portion for coaction with a heat exchange medium for the dissipation of the conducted heat into said medium.

3. A disk brake comprising a disk having a pair of spaced apart oppositely disposed annular friction plates with outer braking surfaces including an annular support flange, cooperating brake members disposed on either side of said friction plates for frictional engagement with said braking surfaces, means for mounting said brake members and said disk for relative rotational movement to each other, a filling substantially solidly formed between said plates having a high coefficient of heat conduction as compared to said plates for the conduction from said plates of heat generated by the frictional engagement of said members with said surfaces, and an annular rib integrally formed with the said filling and having vanes extended from said plates for coaction with an air stream for the dissipation of the conducted heat into said stream.

4. A disk brake comprising a disk including a pair of oppositely disposed friction plates having outer surfaces and forming therebetween a space of tapered cross section, cooperating brake members disposed on either side of said friction plates for frictional engagement with said braking surfaces, means for mounting said brake members and said disk for relative rotational movement to each other, a filling between said plates having a high coefficient of heat conductivity as compared to said plates for the conduction from said plates of heat generated by the frictional engagement of said members with said surfaces, and heat exchange means integrally formed with the said filling and extended from said plates at the region of greatest cross section for coaction with a heat exchange medium for the dissipation of the conducted heat into said medium.

5. A disk brake comprising a disk including a pair of oppositely disposed friction plates having outer braking surfaces and forming therebetween a space of tapered cross section, a wall portion circumferentially joining together said plates at the region of minimum cross section, cooperating brake members disposed on either side of said friction plates for frictional engagement with said braking surfaces, means for mounting said brake members and said disk for relative rotational movement to each other, a filling between said plates having a high coefficient of heat conductivity as compared to said plates for the conduction from said plates of heat generated by the frictional engagement of said members with said surfaces, and heat exchange means integrally formed with the said filling and extended from said plates at the region of greatest cross section for coaction with a heat exchange medium for the dissipation of the conducted heat into said medium.

6. A disk brake comprising a disk having a pair of oppositely disposed friction plates joined together in spaced relation by integral web portions forming a space therebetween of tapered cross section, each of said plates having an outer braking surface, cooperating brake members disposed on either side of said friction plates for frictional engagement with said braking surfaces, means for mounting said brake members and said disk for relative rotational movement to each other, a filling between said plates and said web portions having a high coefficient of heat conductivity as compared to said plates for the conduction from said plates of heat generated by the frictional engagement of said members with said surfaces, and heat exchange means integrally formed with the said filling and extended from said plates at the region of greatest cross section for coaction with a heat exchange medium for the dissipation of the conducted heat into said medium.

7. A disk brake comprising a disk having a pair of spaced apart oppositely disposed friction plates each with an outer braking surface and having an annular integral support flange, a wall portion circumferentially joining said plates together, cooperating brake members disposed on either side of said friction plates for frictional engagement with said braking surfaces, means for mounting said brake members and said disk for relative rotational movement to each other, a filling having a lower melting point as compared to said plates formed between said plates for the conduction of heat generated by the frictional engagement of said members with said surfaces, and an annular rib integrally formed with said filling and having vanes extending therefrom at a point on said filling remote from said wall portion for coaction with a fluid stream for the dissipation of the conducted heat into said stream.

8. A disk brake comprising, a disk including a pair of friction plates formed of relatively high wear and heat resistant metal and having outer braking surfaces, means for integrally joining said plates in fixed spaced relation to each other including an integral web extending therebetween, an annular mounting flange integrally attached to said plates for mounting said disk for rotation, fixed cooperating brake members disposed adjacent said plates for engagement with said braking surfaces, a filling substantially solidly formed between said plates and having a high coefficient of heat conduction as compared to said plates for the conduction from said plates of heat generated by the frictional engagement of said members with said surfaces, and heat exchange means integrally formed with said filling and extending from said plates for coaction with a heat exchange medium for the dissipation of the conducted heat into said medium.

References Cited in the file of this patent

UNITED STATES PATENTS

| | | |
|---|---|---|
| 2,008,173 | Dake et al. | July 16, 1935 |
| 2,255,024 | Eksergian | Sept. 2, 1941 |
| 2,331,259 | Whitten | Oct. 5, 1943 |
| 2,506,823 | Wyant | May 9, 1950 |

FOREIGN PATENTS

| | | |
|---|---|---|
| 638,573 | Great Britain | June 14, 1950 |